(12) United States Patent
Lu et al.

(10) Patent No.: US 9,294,157 B2
(45) Date of Patent: Mar. 22, 2016

(54) RADIO-FREQUENCY IDENTIFICATION SYSTEM

(76) Inventors: Gui-Yang Lu, Upland, CA (US);
Michael F. Cruz, Corona, CA (US);
Peter Troesch, Beverly Hills, CA (US);
Robert E. Malm, Pacific Palisades, CA (US)

( * ) Notice: Subject to any disclaimer, the term of this patent is extended or adjusted under 35 U.S.C. 154(b) by 2710 days.

(21) Appl. No.: 11/841,486

(22) Filed: Aug. 20, 2007

(65) Prior Publication Data

US 2009/0051491 A1    Feb. 26, 2009

(51) Int. Cl.
*H04Q 5/22*    (2006.01)
*H04B 5/00*    (2006.01)

(52) U.S. Cl.
CPC ................................. *H04B 5/0087* (2013.01)

(58) Field of Classification Search
USPC ............ 340/572.4, 572.5, 572.6, 572.7, 10.1, 340/10.3, 10.2
See application file for complete search history.

(56) References Cited

U.S. PATENT DOCUMENTS

| | | | | |
|---|---|---|---|---|
| 3,493,955 A * | 2/1970 | Minasy | ...................... | 340/572.3 |
| 5,065,137 A * | 11/1991 | Herman | ...................... | 340/572.2 |
| 5,510,769 A * | 4/1996 | Kajfez | ............... | G08B 13/2414 336/105 |
| 5,541,604 A * | 7/1996 | Meier | ............................. | 342/42 |
| 5,608,417 A * | 3/1997 | de Vall | ......................... | 343/895 |
| 5,621,396 A * | 4/1997 | Flaxl | .................. | G06K 19/0701 340/10.4 |
| 5,923,300 A * | 7/1999 | Mejia | ...................... | H01Q 1/22 324/338 |
| 5,955,950 A * | 9/1999 | Gallagher et al. | ......... | 340/572.1 |
| 6,094,173 A * | 7/2000 | Nylander | ...................... | 343/742 |
| 6,208,062 B1 * | 3/2001 | Nysen | ................... | G01S 13/755 310/313 R |
| 6,307,468 B1 * | 10/2001 | Ward, Jr. | ............ | G06K 7/10336 340/10.1 |
| 6,351,215 B2 * | 2/2002 | Rodgers et al. | ............ | 340/572.1 |
| 6,388,628 B1 * | 5/2002 | Dettloff et al. | ................ | 343/742 |
| 6,617,856 B1 * | 9/2003 | Royle et al. | .................... | 324/329 |
| 6,720,930 B2 * | 4/2004 | Johnson et al. | ............... | 343/742 |
| 6,750,771 B1 * | 6/2004 | Brand | ........................ | 340/572.7 |
| 7,023,346 B2 * | 4/2006 | Balch et al. | ................ | 340/572.7 |
| 7,106,266 B1 * | 9/2006 | Pauley | .......................... | 343/788 |
| 7,132,778 B1 * | 11/2006 | Nysen | ................... | G01S 13/755 310/313 D |
| 7,187,267 B2 * | 3/2007 | Cole | .................... | G06K 7/0008 235/382.5 |
| 7,187,289 B2 * | 3/2007 | Eckstein | ............ | G08B 13/2414 340/505 |
| 7,205,896 B2 * | 4/2007 | Wu | ..................... | G08B 13/2471 340/10.51 |
| 7,310,045 B2 * | 12/2007 | Inui | ........................ | G01S 5/0247 340/10.1 |
| 7,317,426 B2 * | 1/2008 | Copeland | ........... | G06K 7/10336 343/787 |
| 7,432,874 B2 * | 10/2008 | Meissner | ....................... | 343/867 |
| 7,439,860 B2 * | 10/2008 | Andresky | ............. | G06K 7/0008 340/572.1 |
| 7,570,220 B2 * | 8/2009 | Hall | ................... | G08B 13/2477 340/572.7 |
| 7,642,915 B2 * | 1/2010 | Eckstein | ............ | G08B 13/2414 340/572.1 |

(Continued)

*Primary Examiner* — Jennifer Mehmood
*Assistant Examiner* — Rufus Point
(74) *Attorney, Agent, or Firm* — Robert E. Malm (57) ABSTRACT

The invention is a radio-frequency identification system consisting of a reader and a tag. The reader comprises a transmit/receive resonant circuit comprising one or more coils, a means for repeatedly driving the transmit/receive resonant circuit with pulses of a periodic signal, a means for obtaining a tag response signal from the transmit/receive resonant circuit, a means for extracting tag information from the tag response signal obtained from the transmit/receive resonant circuit, a receive resonant circuit comprising one or more coils, a means for obtaining a tag response signal from the receive resonant circuit, and a means for extracting tag information from the tag response signal obtained from the receive resonant circuit. The tag comprises a plurality of resonant circuits, a means for recognizing he presence of an interrogating magnetic field, and a means for embedding information to be communicated to the interrogating reader in at least one coil current.

77 Claims, 6 Drawing Sheets

(56) References Cited

U.S. PATENT DOCUMENTS

| | | | |
|---|---|---|---|
| 7,647,024 B2* | 1/2010 | Wang et al. | 455/41.2 |
| 7,667,576 B2* | 2/2010 | Chan et al. | 340/286.02 |
| 7,696,876 B2* | 4/2010 | Dimmer | A61B 5/06 340/572.1 |
| 7,706,759 B2* | 4/2010 | Rofougaran | 455/121 |
| 7,751,790 B2* | 7/2010 | Rofougaran | G06K 19/07749 455/292 |
| 7,834,743 B2* | 11/2010 | Nagata | G06K 19/0723 340/10.4 |
| 8,064,864 B2* | 11/2011 | Rofougaran | G06K 19/07749 340/10.1 |
| 2002/0041233 A1* | 4/2002 | Nicholson | 340/572.7 |
| 2002/0097153 A1* | 7/2002 | Youbok | G06K 19/0672 340/572.5 |
| 2003/0117270 A1* | 6/2003 | Dimmer | A61B 5/06 340/10.1 |
| 2003/0142073 A1* | 7/2003 | Fukushima | G06F 3/046 345/158 |
| 2004/0233042 A1* | 11/2004 | Piccoli | E05B 73/0017 340/10.1 |
| 2005/0011961 A1* | 1/2005 | Uesaka | 235/492 |
| 2005/0024198 A1* | 2/2005 | Ward, Jr. | 340/505 |
| 2005/0242959 A1* | 11/2005 | Watanabe | G06K 19/07749 340/572.7 |
| 2006/0017634 A1* | 1/2006 | Meissner | 343/742 |
| 2006/0087422 A1* | 4/2006 | Oda | G06F 3/046 340/524 |
| 2006/0176229 A1* | 8/2006 | Copeland et al. | 343/788 |
| 2006/0214799 A1* | 9/2006 | Yamada | G06K 7/0008 340/572.7 |
| 2006/0267759 A1* | 11/2006 | Levine | A61B 5/06 340/539.12 |
| 2007/0096876 A1* | 5/2007 | Bridgelall et al. | 340/10.1 |
| 2007/0109124 A1* | 5/2007 | Park et al. | 340/572.1 |
| 2007/0216533 A1* | 9/2007 | Hyde | G06K 19/0723 340/572.4 |
| 2007/0229281 A1* | 10/2007 | Shionoiri | G06K 19/06037 340/572.7 |
| 2008/0036606 A1* | 2/2008 | Kuramoto | G06K 7/0008 340/572.7 |
| 2008/0074270 A1* | 3/2008 | Ashwood-Smith | G01S 5/0247 340/572.7 |
| 2009/0109102 A1* | 4/2009 | Dokai | G06K 7/10178 343/702 |
| 2010/0237974 A1* | 9/2010 | Yoon | H01F 17/0013 336/170 |
| 2011/0031928 A1* | 2/2011 | Soar | F41G 1/34 320/108 |
| 2011/0074349 A1* | 3/2011 | Ghovanloo | H02J 5/005 320/108 |

* cited by examiner

RADIO-FREQUENCY IDENTIFICATION SYSTEM

BACKGROUND OF THE INVENTION

1. Field of the Invention

The invention relates generally to radio-frequency identification systems and more particularly to radio-frequency identification systems wherein an interrogating entity transmits a radio signal having a specified carrier frequency and a cooperating object responds with a radio signal having the same carrier frequency as the interrogating signal or a different carrier frequency.

2. Background Art

This invention has its roots in cooperative identification systems which had their electronic beginnings in World War II as Identification—Friend or Foe Systems in which the identifying entity and the object to be identified cooperate in the identification process according to a prearranged scheme. More specifically, the invention relates to systems consisting generically of an interrogator (or "reader") inductively coupled to a transponder (or "tag") where the reader is associated with the identifying entity and the tag is associated with the object to be identified.

Such systems are being used or have the potential of being used for identifying fish, birds, animals, or inanimate objects such as credit cards. Some of the more interesting applications involve objects of small size which means that the transponder must be minute. In many cases it is desirable to permanently attach the tag to the object which means implantation of the device in the tissues of living things and somewhere beneath the surfaces of inanimate objects. In most cases, implantation of the tag within the object forecloses the use of conventional power sources for powering the tag. Sunlight will usually not penetrate the surface of the object. Chemical sources such as batteries wear out and cannot easily be replaced. Radioactive sources might present unacceptable risks to the object subject to identification.

One approach to powering a tag that has been successfully practiced for many years is to supply the tag with power from the reader by means of an alternating magnetic field generated by the reader. This approach results in a small, highly-reliable tag of indefinite life and is currently the approach of choice.

For many applications, convenience and utility dictate that the reader be hand-portable which translates into the use of batteries to power the unit. However, the size and weight of batteries having the requisite capacity to perform the identification function at reasonable ranges without interruption challenge the very concept of hand-portability. The twin goals of ease of use and system performance have been the subject of uneasy compromise in the past. There is a need to harness the recent advances in technology to the design of energy efficient systems in order to realize the full potential of identification systems based on inductive coupling.

BRIEF SUMMARY OF THE INVENTION

The invention is a radio-frequency identification system consisting of a reader and a tag. The reader comprises (1) a transmit/receive resonant circuit comprising one or more coils, (2) a means for repeatedly driving the transmit/receive resonant circuit with pulses of a periodic signal, the fundamental frequency of the periodic signal being the resonant frequency of the resonant circuit and the carrier frequency utilized by the reader in communicating information to a tag, (3) a means for obtaining a tag response signal from the transmit/receive resonant circuit, (4) a means for extracting tag information from the tag response signal obtained from the transmit/receive resonant circuit, (5) a receive resonant circuit comprising one or more coils, (6) a means for obtaining a tag response signal from the receive resonant circuit, and (7) a means for extracting tag information from the tag response signal obtained from the receive resonant circuit.

The tag comprises (1) a plurality of resonant circuits, a resonant circuit comprising a coil and a capacitor, (2) a means for recognizing he presence of an interrogating magnetic field utilizing signals from one or more of the resonant circuits, (3) a means for recognizing the presence of a modulated interrogating magnetic field, (4) a means for obtaining the modulating signal from the modulated interrogating magnetic field utilizing one or more of the resonant circuits, (5) a means for extracting the data contained in the modulating signal, (6) a means for embedding information to be communicated to the interrogating reader in at least one coil current, and (7) a means for obtaining power from an interrogating magnetic field utilizing one or more of the resonant circuits.

DETAILED DESCRIPTION OF THE INVENTION

Figure 1:
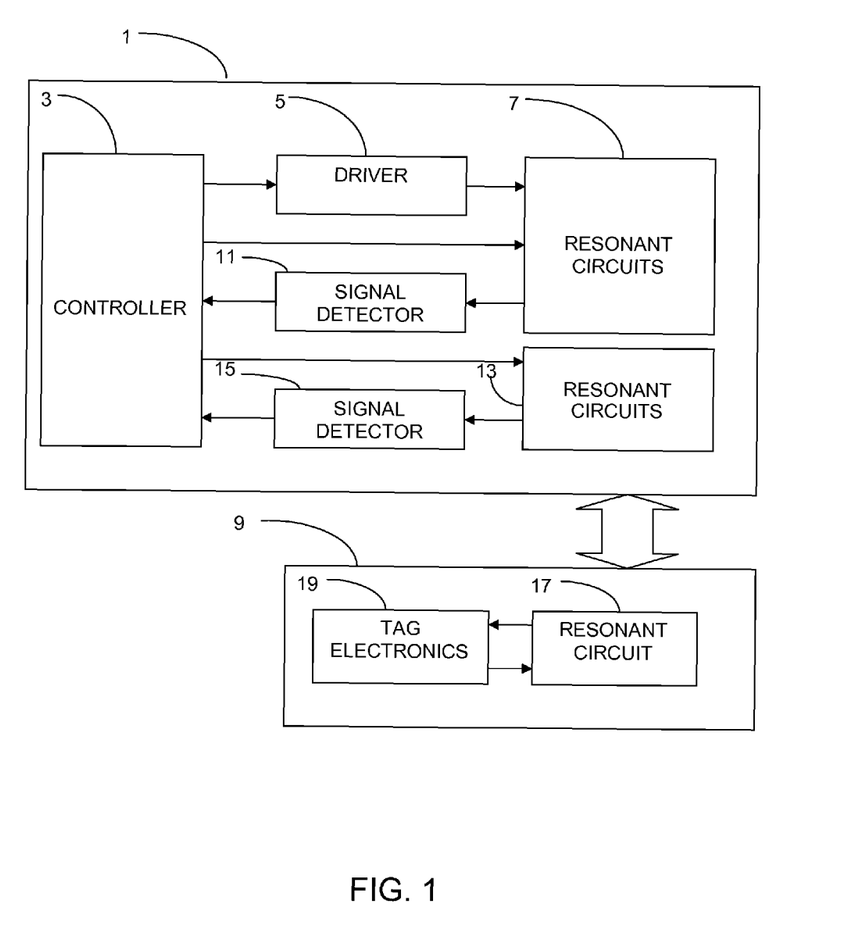
FIG. 1 is a block diagram of a reader embodiment.

The dual-mode reader 1 shown in FIG. 1 operates in either a full-duplex (FDX) mode or a half-duplex (HDX) mode depending on the type of tag that responds to the reader's interrogation. An FDX tag responds while the reader is transmitting an interrogating signal. An HDX tag responds to a reader's interrogation after the reader stops transmitting the interrogating signal.

Controller 3 in reader 1 performs an interrogation by causing driver 5 to repeatedly excite one or more coils associated with each of one or more resonant circuits 7 with a radio-frequency periodic signal pulse until an appropriate response is received from a tag. The resonant circuits 7 may have the same or different resonant frequencies depending on the environment and the application. The fundamental frequency of the periodic-signal pulses (or carrier frequency) will be the same (or nearly the same) as the resonant frequency of the resonant circuit being driven. The phase of the periodic signal that drives a particular coil in a resonant circuit may be different from the phases of the periodic signals that drive the other coils in the resonant circuit.

The interrogating carrier signal may be used to carry information to a tag by means of well-known modulation techniques. A tag, using well-known techniques, can extract the information embedded in the reader's interrogating signal and then respond in an appropriate way to the received information. The reception of an appropriate interrogating signal by itself would typically be interpreted as a request for the tag to embed tag information in the tag's response to the interrogating signal. The reader would then, using well-known techniques, extract the tag information from the tag's response signal.

The magnetic field created by the current flowing through one or more reader coils enables a nearby tag 9 to respond to the interrogation by providing the means for supplying power to the tag. A tag may instead depend on an independent source of power such as a battery. In order to maximize the current through the one or more reader coils and the magnetic field generated by the current, the one or more coils are made a part of one or more resonant circuits.

One or more of resonant circuits 7 also serve to sense magnetic field variations caused by a nearby tag 9 in responding to an interrogation by reader 1. These magnetic field variations are converted into voltage or current variations by the one or more resonant circuits 7 and supplied to signal detector 11 which extracts one or more tag response signals that are embedded in the magnetic field by nearby tag 9. Controller 3 converts these tag response signals supplied by nearby tag 9 into tag information, i.e. information communicated by the tag to the reader.

An alternative way of detecting magnetic field variations caused by a nearby tag 9 is by one or more coils associated with one or more resonant circuits 13 that are separate and distinct from the resonant circuits 7. This approach is particularly advantageous in the case of HDX systems and also when the tag response frequency is different from the interrogating frequency.

One or more resonant circuits 13 converts the magnetic field variations caused by nearby tag 9 into voltage or current variations from which signal detector 15 extracts tag response signals. The tag response signals from signal detector 15 feeds into controller 3 which translates the tag response signals into tag information.

Resonant circuits 7 and resonant circuits 13 are configurable arrangements of coils and capacitors which individually resonate at a particular frequency determined by (1) the inductance and capacitance values of the coils and the capacitors that make up the arrangement and (2) the circuit configuration of the arrangement. When one of resonant circuits 7 is driven at its resonant frequency, maximum current flows through the active coils of the resonant circuit and thereby enables a tag in the vicinity of the reader to more readily detect the presence of an interrogating magnetic field.

In order for a reader to interrogate tags that are responsive to different interrogating frequencies, the frequency of the interrogating signal must be changed from one pulse to the next and either the appropriate resonant circuit must be selected or a particular resonant circuit must be reconfigured. Controller 3 performs these actions by sending either a selection command or a configuration change command to resonant circuits 7. The configuration change is accomplished by switching capacitors or inductors in or out of the circuit or changing the capacitance or inductance of a capacitor or inductor respectively by electrical means.

In the case of HDX systems for which the tag response frequency is the same as the interrogating frequency, it is desirable to reduce the power transferred from resonant circuits 7 to resonant circuits 13 during the transmission of an interrogating pulse. This reduction in transferred power is accomplished by controller 3 sending a "configuration change" command to resonant circuits 13 prior to the transmission of a pulse and then sending a rescinding "configuration change" when the transmission of the pulse has been completed. The "configuration change" can be a resonant circuit disabling change such as short-circuiting the coil or disconnecting the coil from the associated capacitor in the resonant circuits. The "configuration change" can also be a change which detunes the resonant circuit.

A tag incorporates a coil for sensing an interrogating magnetic field. In order for a tag to detect the presence of an interrogating magnetic field, some of the magnetic field lines generated by the reader must pass through the coil in the tag resonant circuit 17—the more, the better. In order to maximize the sensitivity of a tag to the presence of interrogating magnetic fields and to suppress magnetic fields having frequencies other than those of interrogating magnetic fields, the tag coil is also made a part of a resonant circuit.

The degree of magnetic coupling of the reader coils in resonant circuits 7 and 13 and the one or more tag coils in resonant circuit 17 of a nearby tag 9 depends on the relative orientations of the reader coils and the tag coils. Tags can be read at longer ranges from the reader by using multiple, properly-oriented coils in the reader, Similar performance improvements can be realized by using multiple, properly-oriented coils in tags if size and orientation constraints permit.

Figure 2:
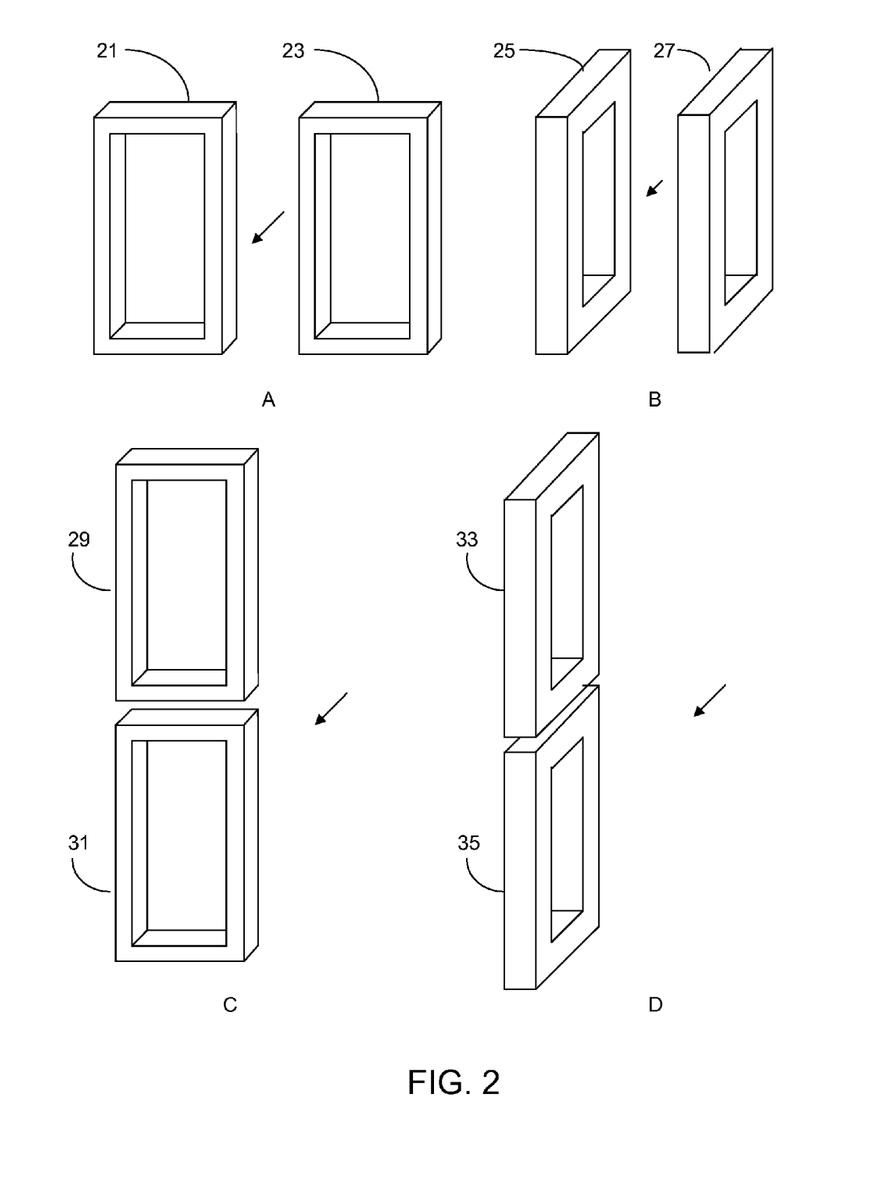
FIG. 2 contains three-dimensional views of four two-coil configurations for readers.

Examples of a few of many possible two-coil configurations for readers are shown in FIG. 2 with the arrows denoting the nominal path and direction of travel of the tag to be identified. The configuration of rectangular coils 21 and 23 shown in FIG. 2A with currents flowing in the same direction (clockwise or counter clockwise) in the two coils produces a maximum magnetic field at a point on the tag path. The configuration of coils 21 and 23 with currents flowing in opposite directions may be used to detect tags traveling in a plane adjacent and parallel to the plane of the coils.

The Helmholtz arrangement of coils 25 and 27 shown in FIG. 2B with currents flowing in the same directions in the two coils provides a more uniform magnetic field in the region between the two coils thereby accommodating tags that accompany objects that are not narrowly constrained to a particular path. Tags may travel in the direction shown in the figure or in a direction normal to the planes of the coils through the center regions of the coils. The configuration of coils 25 and 27 with currents flowing in opposite directions may be used to detect tags traveling between the coils in a plane parallel to the planes of the coils.

The configuration of coils 29 and 31 shown in FIG. 2C with currents flowing in the same direction (clockwise or counter clockwise) in the two coils produces reinforcing magnetic fields at points on the tag path.

The configuration of coils 33 and 35 shown in FIG. 2D with currents flowing in opposite directions in the two coils also produces reinforcing magnetic fields on the tag path.

The two-coil configurations of FIG. 2 are effective in coupling power to a tag coil only if the orientation of the tag coil is such that reader-generated magnetic field lines pass through the tag coil.

Figure 3:
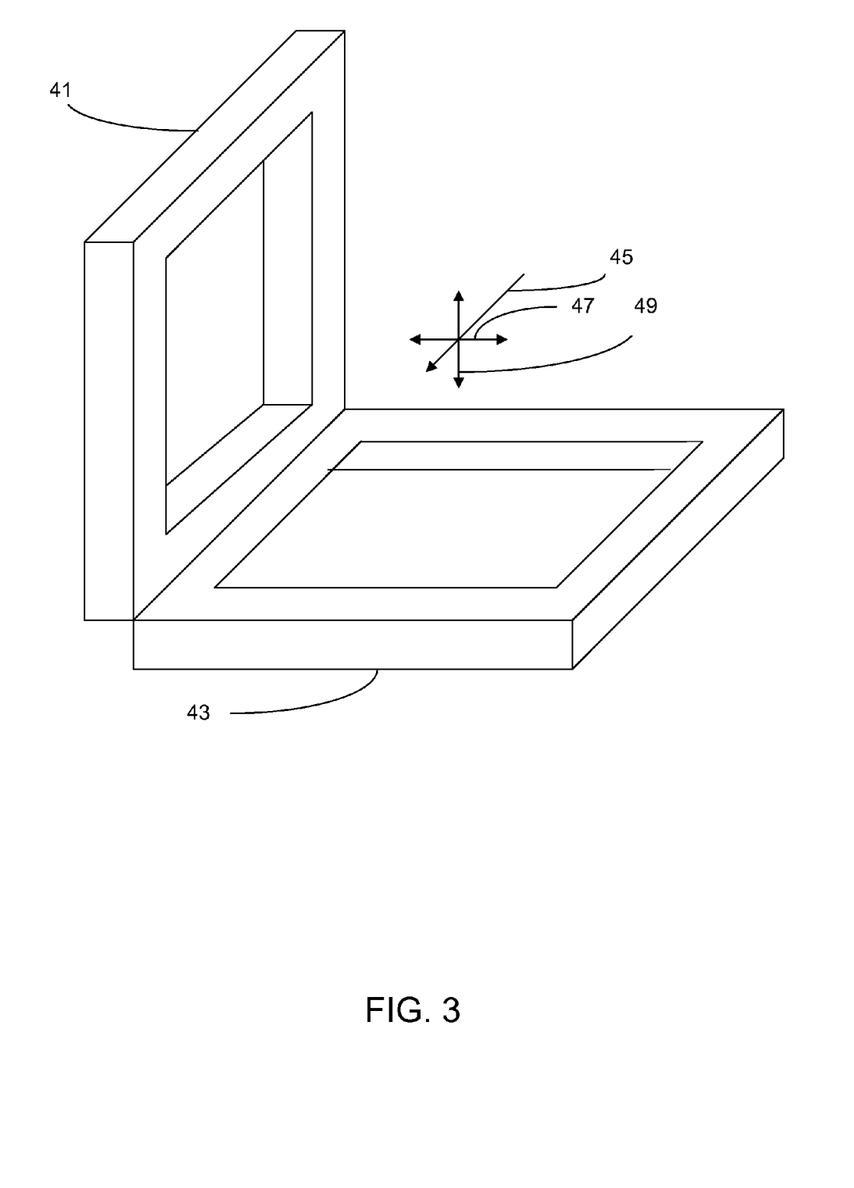
FIG. 3 is a three-dimensional view of a two-coil orthogonal configuration for readers.

A two-coil configuration that is more tolerant of tag-coil orientation for tag path 45 is shown in FIG. 3. Reader coils 41 and 43 are normal to each other and thus coil 41 produces a magnetic field collinear with double-headed arrow 47 and coil 43 produces a magnetic field collinear with double-headed arrow 49. If the currents through coils 41 and 43 vary respectively as $\cos(\omega t)$ and $\sin(\omega t)$, $\omega$ denoting the angular frequency of the current and t denoting time, then the magnetic field at the tag will be a vector which rotates in the plane of the double-headed arrows 47 and 49. The rotating magnetic field will be detectable by the tag coil except when the normal to the tag coil lies within a conical region surrounding the normal to the rotating magnetic field plane, the size of the conical region being determined by noise levels in the detection circuitry.

An alternative to driving coils 41 and 43 in quadrature (as described above) is to drive only coil 41 with odd-numbered interrogating pulses and only coil 43 with even-numbered interrogating pulses. With this driving procedure the magnetic field produced by either coil 41 or coil 43 will be detectable by the tag coil except when the normal to the tag coil lies within a conical region surrounding the normal to the plane containing the magnetic field vectors produced by coils 41 and 43.

The act of "driving a coil" is accomplished by driver 5 (FIG. 1) driving the resonant circuit of which the coil is a part which causes a periodically-reversing current to flow through a resonant circuit in resonant circuits 7 associated with the coil.

A coil can be either active or inactive. To be active, a coil must be a resonating member of the resonant circuit when the resonant circuit is being driven either by a driving device such as driver 5 of FIG. 1 or by another coil that is coupled to the coil in the resonant circuit. If a plurality of coils can be individually switched into or out of a particular resonant circuit, the process of switching a coil into a resonant circuit and becoming a resonating member of the circuit will be referred to as making the coil "active" in the resonant circuit. The inductance of an active coil has a significant effect on the resonant frequency of the resonant circuit while the inductance of an inactive coil has an insignificant effect. "Driving a coil" in these circumstances means driving the resonant circuit in which the coil is active.

In certain circumstances, it may be desirable to associate each coil with its own resonant circuit. "Driving a coil" in these circumstances is the same as driving the resonant circuit with which the coil is associated.

Figure 4:
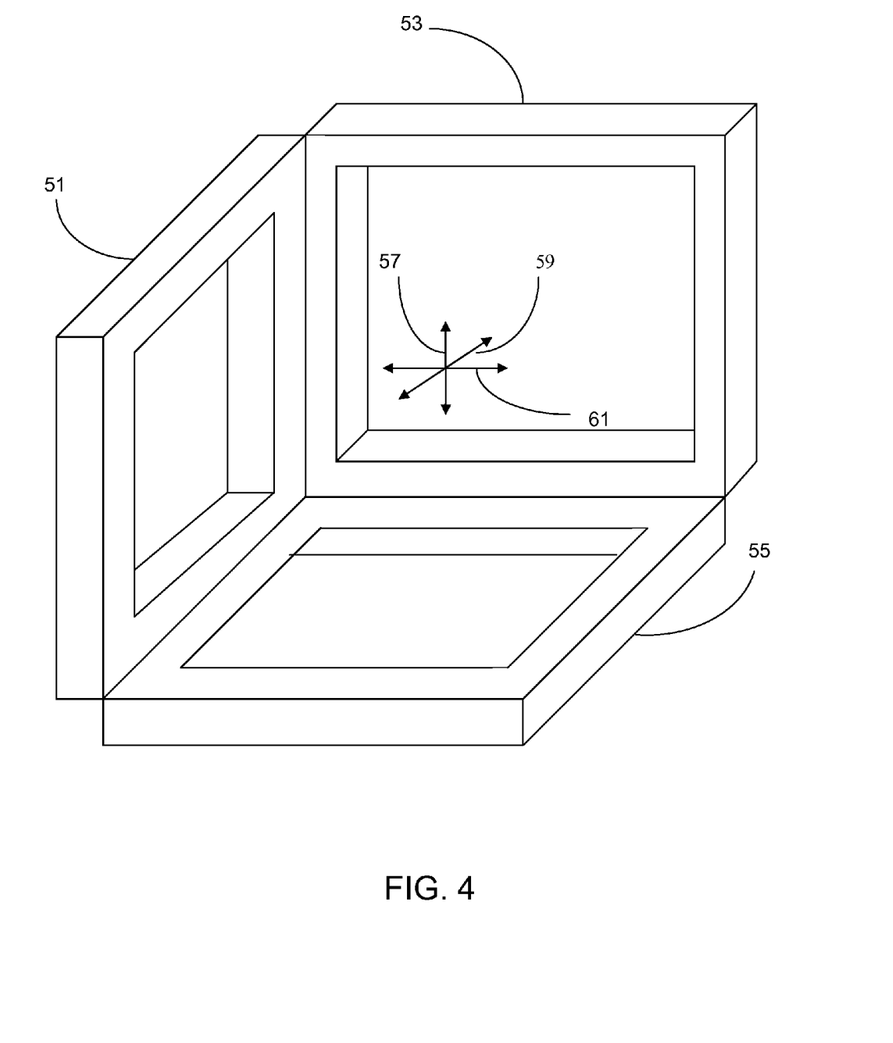
FIG. 4 is a three-dimensional view of a three-coil orthogonal configuration for readers.

A three-coil configuration that is more tolerant of tag-coil orientation than the two-coil configuration of FIG. 3 is shown in FIG. 4. Reader coils 51, 53, and 55 are all normal to each other and thus coil 51 produces a magnetic field collinear with double-headed arrow 61, coil 53 produces a magnetic field collinear with double-headed arrow 59, and coil 55 produces a magnetic field collinear with double-headed arrow 57. If the current through coil 53 is zero and the currents through coils 51 and 55 vary respectively as $\cos(\omega t)$ and $\sin(\omega t)$, $\omega$ denoting the angular frequency of the current and t denoting time, then the magnetic field at the tag will be a vector which rotates in the plane of the double-headed arrows 57 and 61. As in the case of the two-coil configuration of FIG. 3, the rotating magnetic field will be detectable by the tag coil except when the normal to the tag coil lies within a conical region surrounding the normal to the rotating magnetic field plane, the size of the conical region being determined by noise levels in the detection circuitry.

This detectability problem can be solved by driving only coils 51 and 55 in quadrature during odd-numbered interrogating pulses and driving only coil 53 during even-numbered interrogating pulses. With this approach, a tag would be able to detect an interrogating magnetic field within a time period encompassing the transmission of two interrogating pulses, regardless of the orientation of the tag coil.

An alternative to the driving process described above is a (pulse number)$_{modulo\ 3}$ routine whereby only coil 51 is driven when (pulse number)$_{modulo\ 3}$ equals 0, only coil 53 is driven when (pulse number)$_{modulo\ 3}$ equals 1, and only coil 55 is driven when (pulse number)$_{modulo\ 3}$ equals 2. (Note that a sequence of pulses numbered with consecutive integers 0, 1, 2, 3, 4, 5, 6, 7, . . . translates into the sequence (pulse number)$_{modulo\ 3}$ 0, 1, 2, 0, 1, 2, 0, 1, . . .

With this driving routine the magnetic field produced by either coil 51, coil 53, or coil 55 will be detectable by the tag coil within a time period encompassing the transmission of three interrogating pulses, regardless of the orientation of the tag coil.

Coils 51, 53, and 55 may be driven simultaneously with signals having different phases and thereby provide a magnetic field for which there is a high probability of detection by a tag of arbitrary orientation during the transmission of a single interrogating pulse. For example, the three coils may be driven with currents which vary respectively as $\cos(\omega t)$, $\cos(\omega t-2\pi/3)$, and $\cos(\omega t+2\pi/3)$, $\omega$ denoting the angular frequency of the current and t denoting time. With this driving routine the magnetic field produced by the combination of coil 51, coil 53, or coil 55 may not be detectable for a limited number of tag orientations but the likelihood of a detection failure is very small.

Figure 5:
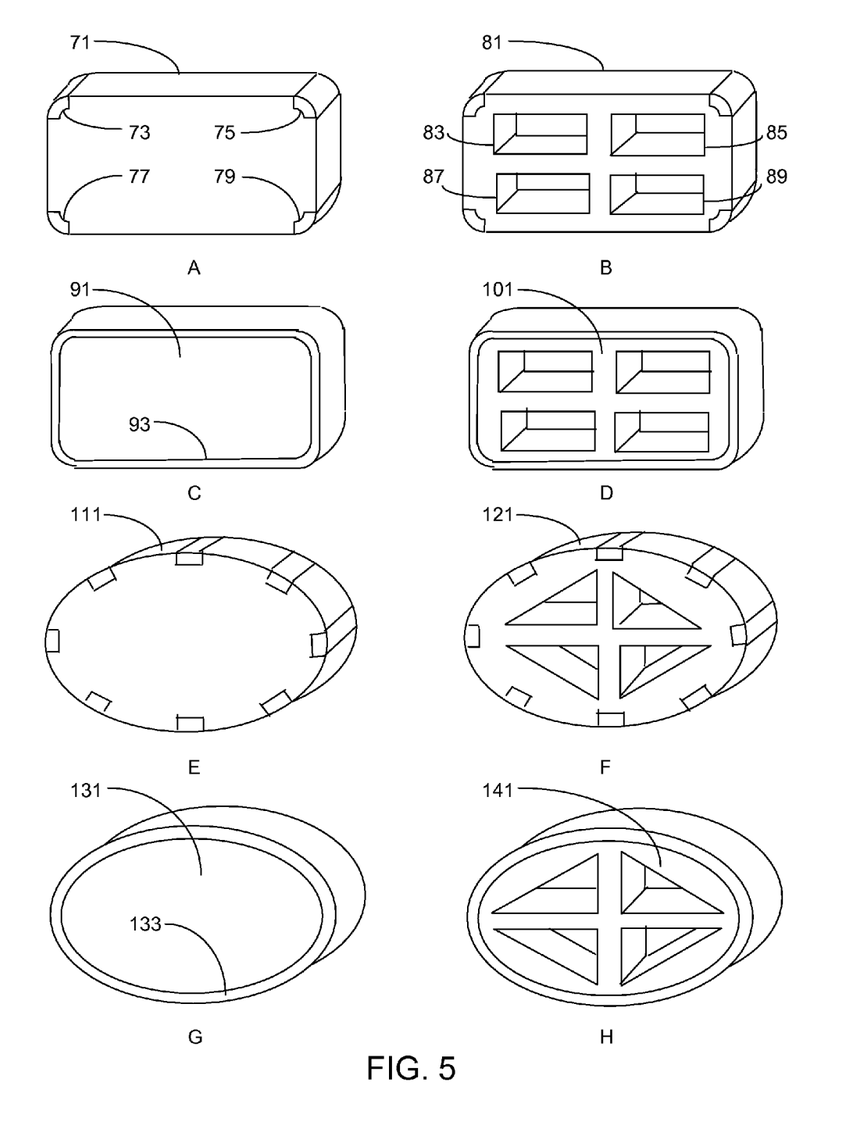
FIG. 5 shows three-dimensional views of eight coil forms which utilize a plastic foam as the major structural component for reader coils.

A coil is typically wound on and subsequently supported by a coil form. For many applications it is desirable that the form be structurally rigid and light in weight. The forms shown in FIG. 5 utilize a plastic foam (e.g. polyurethane foam) as the major structural component and thereby satisfy both criteria.

FIG. 5A shows a form for winding a rectangular coil. The shape-establishing member 71 is made of a plastic foam. Such a form can be readily molded using conventional plastic-foam molding techniques. For small quantities, the form may be cut from larger pieces of commercially-available foam cushions or pads.

The tension in the wire that results from the winding process would tend to apply shear forces exceeding the tear strength of the plastic foam at the corners of the form. It is consequently advisable to incorporate molded-plastic wire-support members 73, 75, 77, and 79 at the corners.

FIG. 5B shows a form similar to that of FIG. 5A. The weight of the shape-establishing member 81 is reduced by incorporating rectangular holes 83, 85, 87, and 89. Although, the weight is reduced, the necessary rigidity of the shape-establishing member is retained.

FIG. 5C shows a version of a coil form wherein the shape-establishing member 91 is encircled by a wire-support strip 93. The wire-support strip may be incorporated with the shape-establishing member during the molding process or subsequently attached to the shape-establishing member. A suitable material for the strip in either case is a thermoplastic polyurethane elastomer.

FIG. 5D shows a coil form like that of FIG. 5C except for shape-establishing member 101 having the weight-reducing holes of shape-establishing member 81.

FIGS. 5E, 5F, 5G, and 5H show the same features as FIGS. 5A, 5B, 5C, and 5D except that shape-establishing members 111, 121, 131, and 141 are ovals rather than rectangles.

Figure 6:
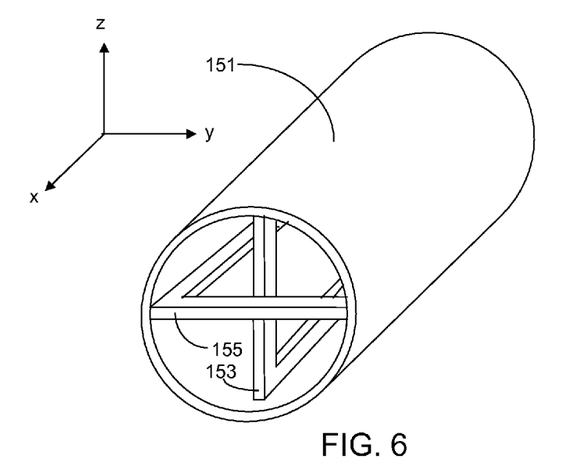
FIG. 6 shows a three-dimensional view of a three-coil configuration for a tag.

A multi-coil configuration for use in tags is shown in FIG. 6. Cylindrically-wound coil 151 encloses rectangular coils 153 and 155. In order to increase the inductance of the coils, a shared ferrite core can be incorporated within coil 151 and the perimeters of coils 153 and 155.

The configuration of FIG. 6 illustrates how three coils capable of generating orthogonal magnetic field can be compactly packaged in a common volume. Being packaged in a common volume means that there is no plane that separates one coil from either of the other two coils.

Coil 151 is maximally-sensitive to time-varying magnetic fields in the x-direction. Coils 153 and 155 are maximally-sensitive to time-varying magnetic fields in the y- and z-directions respectively. Thus, the current responses $I_{151}$, $I_{153}$, and $I_{155}$ of coils 151, 155, and 153 to a time-varying vector magnetic field H of arbitrary orientation will be proportional respectively to the three Cartesian components $H_x$, $H_y$, and $H_z$ of H: $I_{151}=K_xH_x$, $I_{153}=K_yH_y$, and $I_{155}=K_zH_z$ where the K's are the proportionality constants. It should be noted that the tag's orientation will have no effect on the detectability of an interrogating signal if the tag takes advantage of having the three Cartesian components of the reader's field available.

Moreover, the communication range of a tag to a reader can be maximized by the tag's modulating the magnetic field in a way that a reader is most sensitive to. Typically, tag information is communicated to a reader by changes in the magnitude of the magnetic field. Since the reader's coil produces a vector interrogating field H with magnitude H at the tag's location, the tag information will be most effectively communicated to a reader if it is manifested at the tag as A(t)H where A(t) is a waveform in which the tag information is embedded. The precepts outlined above can be followed by the tag causing the currents $A(t)I_{151}/K_x$, $A(t)I_{153}/K_y$, and $A(t)I_{155}K_z$ to flow respectively in coils 151, 153, and 155.

Figure 7:
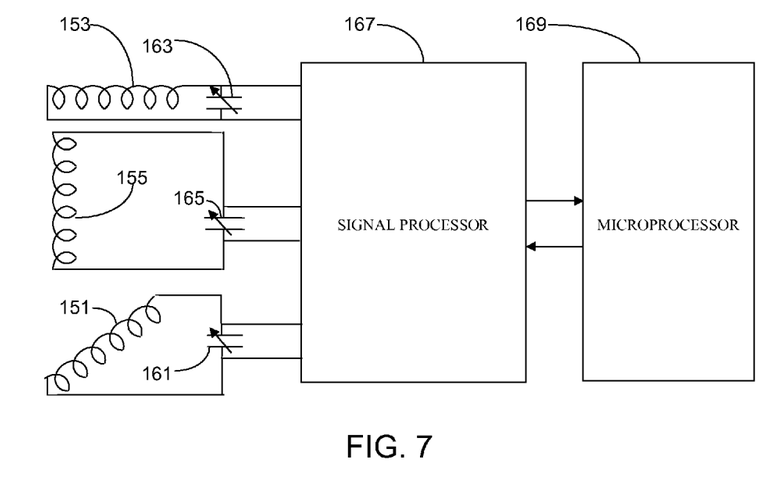
FIG. 7 is a block diagram of a tag embodiment.

An embodiment of a tag incorporating the coil configuration of FIG. 6 is shown in FIG. 7. As discussed above, coils 151, 153, and 155 are maximally-sensitive to magnetic fields along the x-, y-, and z-axes respectively. Resonant circuits are created by the addition of adjustable capacitors 161, 163, and 165 which can be adjusted in value so that each resonant circuit can be tuned to a particular interrogating frequency of interest. The adjustable capacitors may take the form of banks of capacitors which may selectably be connected in parallel so as to create an effective capacitor having any one of a plurality of specified capacitance values.

Signal processor 167 processes the signals provided by resonant circuits 151/161, 153/163, and 155/165 for the purposes of (1) providing the power needed for the tag to respond to interrogating signals, (2) determining the parameters and characteristics of the interrogating magnetic field and the resonant-circuit signals that result from the interrogating magnetic field, (3) determining whether the interrogating magnetic field is modulated with data, and if so, (4) extracting this data from the resonant-circuit signals, and (5) transforming data supplied by microprocessor 169 into signals which can be introduced into the resonant circuits and thereby either modulate an existing magnetic field created by a reader or create a modulated magnetic field when a reader-generated magnetic field is no longer present.

If the tag is not independently powered in some way, signal processor 167 can extract power from an interrogating magnetic field by separately rectifying the current obtained from each resonant circuit and integrating the rectified current by means of an energy-storage capacitor. The positive terminals of the energy-storage capacitors associated with the resonant circuits are connected through diodes to a common terminal which, after voltage regulation, can be the source of power for some or all of the tag electronics. The diodes prevent the flow of current from one energy-storage capacitor into either of the other two energy-storage capacitors.

When the voltage across any one of the energy-storage capacitors exceeds a power-up threshold, signal processor 167 and microprocessor 169 are powered up and signal processor 167 obtains digitized measures of the voltages $V_{ES151}$, $V_{ES153}$, and $V_{ES155}$ across the energy-storage capacitors associated respectively with coils 151, 153, and 155. The voltages $V_{ES151}$, $V_{ES153}$, and $V_{ES155}$ are proportional to the currents $I_{151}$, $I_{153}$, and $I_{155}$ flowing respectively through coils 151, 153, and 155 and are made available to microprocessor 167.

Signal processor 167 compares the phases of voltages $V_{S151}$, $V_{S153}$, and $V_{S155}$ appearing across coils 151, 153, and 155, reverses the signs of the quantities where necessary to bring all of the voltages in phase with one another, and then combines the three in-phase voltages $P_{151}V_{S151}$, $P_{153}V_{S153}$, and $P_{155}V_{S155}$ into the single voltage $V_S$ where the quantities $P_{151}$, $P_{153}$, and $P_{155}$ have values of either plus or minus one.

Signal processor 167 generates a square-wave carrier clock signal which has the same frequency as and is synchronized to the carrier frequency of $V_S$. Signal processor 167 determines whether the $V_S$ carrier is modulated with data, and if it is, a bit-rate clock signal is obtained by dividing down the carrier clock signal and synchronizing this divided-down signal with the incoming bit stream from the interrogating reader. Any other clock signals required by the tag are derived in a similar fashion from the carrier clock signal.

If the interrogating signal carries information, this information is extracted by signal processor 167 from $V_S$ and supplied in the form of an analog bit sequence to microprocessor 169.

Overall control of the tag operations is exercised by microprocessor 169 which recognizes the presence of an interrogating signal and causes tag information to be communicated to the interrogating reader if the interrogating signal can be authenticated if such authentication information is contained in the interrogating signal $V_S$. Microprocessor 169 also screens the tag information that may be incorporated in the response to an interrogating reader in accordance with the level of authorization indicated in the interrogating signal.

Tag information to be transmitted to the reader is supplied as a bit sequence by microprocessor 169 to signal processor 167 which transforms the bit sequence into coil current waveforms for coils 151, 153, and 155 given respectively by $A(t)P_{151}V_{ES151}/K_x$, $A(t)P_{153}V_{ES153}/K_y$, and $A(t)P_{155}V_{ES155}/K_z$ where A(t) is a waveform in which the tag data is embedded. These expressions are the same as those given previously with the proportional in-phase voltages $P_{151}V_{ES151}$, $P_{153}V_{ES153}$, and $P_{155}V_{ES155}$ substituted respectively for the coil currents $I_{ES151}$, $I_{ES153}$, and $I_{ES155}$.

The invention claimed is:

1. A radio-frequency identification system reader comprising:
    a resonant circuit comprising a plurality of coils
    a means for repeatedly driving the resonant circuit with pulses of a periodic signal, the fundamental frequency of the periodic signal being the resonant frequency of the resonant circuit;
    a means for obtaining a tag response signal from the resonant circuit;
    a means for extracting tag information from the tag response signal.

2. The reader of claim 1 wherein a coil is controllably either an active or an inactive resonating member of the resonant circuit.

3. The reader of claim 1 wherein a portion of one coil is adjacent to a portion of another coil, the current flowing in the same direction through the two adjacent portions when both coils are active.

4. The reader of claim 1 wherein at least two coils are in different planes.

5. The reader of claim 4 wherein two coils are in orthogonal planes.

6. The reader of claim 4 wherein three coils are in orthogonal planes.

7. The reader of claim 1 further comprising:
a means for making one or more coils active in the resonant circuit prior to driving the resonant circuit with a pulse, the remaining coils being made inactive.

8. A radio-frequency identification system reader comprising:
a transmit/receive resonant circuit comprising one or more coils;
a means for repeatedly driving the transmit/receive resonant circuit with pulses of a periodic signal, the fundamental frequency of the periodic signal being the resonant frequency of the resonant circuit;
a means for obtaining a tag response signal from the transmit/receive resonant circuit;
a means for extracting tag information from the tag response signal obtained from the transmit/receive resonant circuit;
a receive resonant circuit comprising one or more coils;
a means for obtaining a tag response signal from the receive resonant circuit;
a means for extracting tag information from the tag response signal obtained from the receive resonant circuit.

9. The reader of claim 8 wherein a coil is controllably either an active or an inactive resonating member of the transmit/receive resonant circuit.

10. The reader of claim 8 wherein a portion of one coil is adjacent to a portion of another coil, the current flowing in the same direction through the two adjacent portions when the coils are active.

11. The reader of claim 8 wherein at least two coils are in different planes.

12. The reader of claim 11 wherein two coils are in orthogonal planes.

13. The reader of claim 11 wherein three coils are in orthogonal planes.

14. The reader of claim 8 further comprising:
a means for making one or more coils active in the transmit/receive resonant circuit prior to driving the transmit/receive resonant circuit with a pulse, the remaining coils being made inactive.

15. The reader of claim 8 wherein the tag response signal is obtained from the transmit/receive resonant circuit while the transmit/receive resonant circuit is being driven.

16. The reader of claim 8 further comprising:
a means for reducing the transfer of power from the transmit/receive resonant circuit to the receive resonant circuit while the transmit/receive resonant circuit is being driven.

17. The reader of claim 16 wherein reducing the transfer of power is accomplished by disabling the receive resonant circuit.

18. The reader of claim 16 wherein reducing the transfer of power is accomplished by changing the resonant frequency of the receive resonant circuit.

19. The reader of claim 8 wherein a coil is controllably either an active or inactive resonating member of the receive resonant circuit.

20. The reader of claim 8 wherein a portion of one coil is adjacent to a portion of another coil, the current flowing in the same direction through the two adjacent portions when the coils are stimulated by a magnetic field.

21. The reader of claim 8 wherein at least two coils are in different planes.

22. The reader of claim 21 wherein two coils are in orthogonal planes.

23. The reader of claim 21 wherein three coils are in orthogonal planes.

24. The reader of claim 8 further comprising:
a means for making one or more coils active in the receive resonant circuit subsequent to ending the driving of the transmit/receive resonant circuit with a pulse, the remaining coils being made inactive.

25. The reader of claim 8 wherein a tag response signal is obtained from the receive resonant circuit while the transmit/receive resonant circuit is not being driven.

26. A radio-frequency identification system reader comprising:
a plurality of resonant circuits, each resonant circuit comprising one or more coils connected in parallel with a capacitor, the resonant circuits having the same or different resonant frequencies depending on the environment and the application;
a means for repeatedly driving each of the plurality of resonant circuits with pulses of a periodic signal, the fundamental frequency of the periodic signal being the resonant frequency of the resonant circuit being driven;
a means for obtaining one or more tag response signals from one or more of the plurality of resonant circuits;
a means for extracting tag information from the one or more tag response signals.

27. The reader of claim 26 wherein one or more coils of two or more resonant circuits are in different planes.

28. The reader of claim 27 wherein one or more coils of two resonant circuits are respectively in two orthogonal planes.

29. The reader of claim 27 wherein one or more coils of three resonant circuits are respectively in three orthogonal planes.

30. The reader of claim 26 wherein the phase of the periodic signal is different for each of at least two resonant circuits having the same resonant frequency.

31. The reader of claim 30 wherein two of the resonant circuits are driven out of phase by 90 degrees.

32. The reader of claim 30 wherein three of the resonant circuits are driven out of phase with one another by 120 degrees.

33. A radio-frequency identification system reader comprising:
a plurality of transmit/receive resonant circuits, each transmit/receive resonant circuit comprising one or more coils, the resonant circuits having the same or different resonant frequencies depending on the environment and the application;
a means for repeatedly driving each of the plurality of transmit/receive resonant circuits with pulses of a periodic signal, the fundamental frequency of the periodic signal being the resonant frequency of the transmit/receive resonant circuit being driven;
a means for obtaining one or more tag response signal from one or more of the plurality of transmit/receive resonant circuits;
a means for extracting tag information from the one or more tag response signals,
one or more receive resonant circuits, each receive resonant circuit comprising one or more coils;
a means for obtaining one or more tag response signals from one or more receive resonant circuits;
a means for extracting tag information from one or more tag response signals obtained from the receive resonant circuits.

34. The reader of claim 33 wherein one or more coils of two or more resonant circuits are in different planes.

35. The reader of claim 34 wherein one or more coils of two resonant circuits are respectively in two orthogonal planes.

36. The reader of claim 34 wherein one or more coils of three resonant circuits are respectively in three orthogonal planes.

37. The reader of claim 33 wherein the phase of the periodic signal is different for each of at least two transmit/receive resonant circuits having the same resonant frequency.

38. The reader of claim 37 wherein two of the transmit/receive resonant circuits are driven out of phase by 90 degrees.

39. The reader of claim 37 wherein three of the transmit/receive resonant circuits are driven out of phase with one another by 120 degrees.

40. The reader of claim 33 further comprising a means for reducing the transfer of power from the transmit/receive resonant circuits to the receive resonant circuits while the transmit/receive resonant circuits are being driven.

41. The reader of claim 40 wherein reducing the transfer of power is accomplished by disabling at least one of the receive resonant circuits.

42. The reader of claim 40 wherein reducing the transfer of power is accomplished by changing the resonant frequency of at least one of the receive resonant circuits.

43. The reader of claim 33 wherein the one or more tag response signals are obtained from one or more receive resonant circuits while the transmit/receive resonant circuits are not being driven.

44. A radio-frequency identification system reader comprising:
a transmit/receive resonant circuit comprising one or more coils;
a means for repeatedly driving the transmit/receive resonant circuit with pulses of a periodic signal, the fundamental frequency of the periodic signal being the resonant frequency of the resonant circuit;
a means for obtaining the tag response signal from the transmit/receive resonant circuit;
a means for extracting tag information from the tag response signal from the transmit/receive resonant circuit;
a plurality of receive resonant circuits, each receive resonant circuit comprising one or more coils;
a means for obtaining one or more tag response signals from one or more receive resonant circuits;
a means for extracting tag information from one or more tag response signals obtained from the receive resonant circuits.

45. The reader of claim 44 wherein the tag response signal is obtained from the transmit/receive resonant circuit while the transmit/receive resonant circuit is being driven.

46. The reader of claim 44 further comprising a means for reducing the transfer of power from the transmit/receive resonant circuit to the receive resonant circuits while the transmit/receive resonant circuit is being driven.

47. The reader of claim 46 wherein reducing the transfer of power is accomplished by disabling at least one of the receive resonant circuits.

48. The reader of claim 46 wherein reducing the transfer of power is accomplished by changing the resonant frequency of at least one of the receive resonant circuits.

49. The reader of claim 44 wherein the one or more tag response signals from one or more receive resonant circuits is obtained while the transmit/receive resonant circuits are not being driven.

50. A radio-frequency identification system reader comprising:
one or more resonant circuits, each resonant circuit comprising one or more coils, at least one coil being wound on and supported by a coil form, the coil form comprising a shape-establishing member and one or more wire-support members for maintaining the coil windings on or in the proximity of the surface of the shape-establishing member,
a means for repeatedly driving at least one of the resonant circuits with pulses of a periodic signal, the fundamental frequency of the periodic signal being the resonant frequency of the resonant circuit being driven;
a means for obtaining one or more tag response signals from one or more of the resonant circuits;
a means for extracting tag information from the one or more tag response signals.

51. The reader of claim 50 wherein the shape-establishing member is made of a plastic foam material.

52. The reader of claim 50 wherein one or more of the wire-support members are attached to or embedded in the surface of the shape-establishing member.

53. A radio-frequency identification system tag comprising:
a plurality of resonant circuits, a resonant circuit comprising a coil and a capacitor;
a means for recognizing the presence of an interrogating magnetic field utilizing signals from one or more of the resonant circuits;
a means for embedding information to be communicated to the interrogating reader in at least one coil current.

54. The tag of claim 53 wherein the planes of at least two coils associated with different resonant circuits are orthogonal, the plane of a coil being a plane parallel to the planes of the wire turns of the coil.

55. The tag of claim 54 wherein the planes of three coils associated with different resonant circuits are orthogonal.

56. The tag of claim 53 wherein the coils associated with at least two different resonant circuits occupy a common volume of space, one of the coils being contained within the interior of the second coil.

57. The tag of claim 53 wherein the coils associated with three different resonant circuits occupy a common volume of space, two of the coils being contained within the interior of the third coil.

58. The tag of claim 53 wherein at least two coils associated with different resonant circuits share a common ferrite core.

59. The tag of claim 58 wherein three coils associated with different resonant circuits share a common ferrite core.

60. The tag of claim 53 wherein the resonant circuits are tunable to any one of a plurality of frequencies.

61. The tag of claim 60 wherein two or more resonant circuits are tuned to different frequencies while waiting for an interrogating magnetic field to occur.

62. The tag of claim 60 wherein two or more resonant circuits are tuned to the frequency of an interrogating magnetic field when the presence of the interrogating magnetic field is recognized.

63. The tag of claim 53 wherein the information is extracted from the largest signal obtained from the one or more resonant circuits.

64. The tag of claim 53 wherein the information is extracted from a combined signal obtained by combining the signals obtained from at least two resonant circuits.

65. The tag of claim 64 wherein the phases of the resonant-circuit signals are adjusted prior to combining so as to be in phase with one another.

66. The tag of claim 53 wherein the information is embedded in the current of the coil producing the largest interrogating signal.

67. The tag of claim 53 wherein the information is embedded in the currents of two or more coils.

68. The tag of claim 67 wherein the magnetic field in which the information is embedded is in the same or opposite direction as the interrogating magnetic field.

69. The tag of claim 53 wherein the information to be embedded in at least one coil current depends on the level of authorization provided by the interrogating signal.

70. The tag of claim 69 wherein no information is embedded nor is a response made to the interrogating signal if the reader is not authenticated.

71. The tag of claim 53 further comprising a means for recognizing the presence of a modulated interrogating magnetic field.

72. The tag of claim 71 further comprising:
a means for obtaining the modulating signal from the modulated interrogating magnetic field utilizing one or more of the resonant circuits;
a means for extracting the data contained in the modulating signal.

73. The tag of claim 72 further comprising a means for determining the authenticity of the interrogating reader.

74. The tag of claim 72 further comprising a means for executing commands contained in the extracted data.

75. The tag of claim 53 further comprising a means for obtaining power from an interrogating magnetic field utilizing one or more of the resonant circuits.

76. The tag of claim 75 wherein the signal from each of the one or more resonant circuits is rectified and integrated in an energy-storage capacitor.

77. The tag of claim 76 wherein the voltages across two or more energy-storage capacitors are combined for the purpose of supplying power for performing the tag functions.

* * * * *